United States Patent
Akazawa et al.

(10) Patent No.: US 8,776,927 B2
(45) Date of Patent: Jul. 15, 2014

(54) VEHICLE BATTERY PACK HOUSING STRUCTURE

(75) Inventors: Daisuke Akazawa, Atsugi (JP); Yasutsune Terashima, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 85 days.

(21) Appl. No.: 13/701,180

(22) PCT Filed: May 23, 2011

(86) PCT No.: PCT/IB2011/001104
§ 371 (c)(1), (2), (4) Date: Nov. 30, 2012

(87) PCT Pub. No.: WO2011/154790
PCT Pub. Date: Dec. 15, 2011

(65) Prior Publication Data
US 2013/0068548 A1 Mar. 21, 2013

(30) Foreign Application Priority Data
Jun. 8, 2010 (JP) .................................. 2010-130769

(51) Int. Cl.
*B60R 16/04* (2006.01)
(52) U.S. Cl.
USPC .... 180/68.5; 180/65.1; 180/65.21; 180/65.22
(58) Field of Classification Search
USPC ......................... 180/65.8, 65.1, 65.21, 65.22
See application file for complete search history.

(56) References Cited

U.S. PATENT DOCUMENTS

| 4,506,748 A * | 3/1985 | Thomas ........................ 180/68.5 |
| 6,109,380 A * | 8/2000 | Veenstra ...................... 180/68.5 |
| 2007/0279001 A1* | 12/2007 | Tononishi ..................... 320/112 |
| 2010/0307848 A1* | 12/2010 | Hashimoto et al. .......... 180/68.5 |

FOREIGN PATENT DOCUMENTS

| EP | 0333267 | 9/1989 |
| EP | 1464567 | 10/2004 |
| JP | 6-263064 A | 9/1994 |
| JP | 2008-184015 | 8/2008 |
| RU | 2260538 C2 | 9/2005 |
| SU | 748585 A1 | 7/1980 |

OTHER PUBLICATIONS

An English translation of the Japanese Office Action for the corresponding Japanese patent application No. 2010-130769 issued on Feb. 18, 2014.

(Continued)

*Primary Examiner* — Hau Phan
*Assistant Examiner* — Bryan Evans
(74) *Attorney, Agent, or Firm* — Global IP Counselors, LLP

(57) ABSTRACT

A vehicle battery pack housing structure includes a vehicle body panel and first, second and third panel components that define an outward-opening battery housing space. The first panel component is rigidly attached to the vehicle body panel and includes a first side wall and a base wall. The second panel component is rigidly attached to the first panel component and includes a second side wall and a first periphery wall portion. The third panel component is rigidly attached to the second panel component. The third panel component includes a second periphery wall portion that cooperates with the first periphery wall portion to form a periphery wall portion when the third panel component is rigidly attached to the second panel component.

16 Claims, 6 Drawing Sheets

(56) References Cited

OTHER PUBLICATIONS

International Search Report of PCT/IB2011/001243 dated Sep. 28, 2011, mailed Oct. 7, 2011.

An English translation of the Russian Notice of Allowance for the corresponding Russian patent application No. 2012155594/11(088032) issued on Jan. 28, 2014.

* cited by examiner

VEHICLE BATTERY PACK HOUSING STRUCTURE

CROSS-REFERENCE TO RELATED APPLICATIONS

This application is a U.S. National stage of International Application No. PCT/IB2011/001104, filed May 23, 2011. This application claims priority to Japanese Patent Application No. 2010-130769, filed on Jun. 8, 2010. The entire disclosure of Japanese Patent Application No. 2010-130769 is hereby incorporated herein by reference.

BACKGROUND

1. Field of the Invention

The present invention generally relates to a vehicle battery pack housing structure. More particularly, the present invention relates to a vehicle battery pack housing for an electric vehicle, hybrid vehicle, or other type of vehicle having components, such an electric motor, powered by a battery.

2. Background Information

An electric or hybrid vehicle uses an electric motor as a source of power to propel the vehicle. Therefore, such a vehicle typically includes a large-capacity battery pack as a source of electrical power for the electric motor. A large capacity battery pack typically includes numerous battery units that are electrically connected to each other to form a single battery pack. The battery pack, which can also be referred to as a battery module, is generally heavy and large in size. Thus, when mounting such a battery pack in a vehicle, the battery pack should be mounted so as to not sacrifice vehicle interior space. Also, the mounting area in the vehicle should be configured to ensure that the size of the battery pack is not particularly limited, which would reduce the capacity of the battery. Also, the mounting area should be positioned to ensure that the center of gravity of the vehicle is not elevated to an undesirable amount.

A battery pack housing structure is described in Japanese Laid-Open Patent Application No. 06-199183. The battery pack housing structure includes a battery housing space that is provided in a floor panel portion of the vehicle body directly below a seat attachment point. That is, in many vehicles, an unused dead space exists below the front seats, the rear seats, or both. The battery housing space is configured as a downward-opening upward depression in the vertical direction of the vehicle body that houses the battery pack. Accordingly, the battery back can be housed in the dead space, and the capacity of the battery pack can be increased with little or no sacrifice of vehicle interior space. Furthermore, the battery housing space is provided below the center of gravity of the vehicle body, which lowers the center of gravity of the vehicle and can increase vehicle stability.

SUMMARY

However, Japanese Laid-Open Patent Application No. 06-199183 fails to describe a specific procedure for providing the battery housing space as a downward-opening upward depression in the vertical direction of the vehicle body in a floor panel of the vehicle body. Thus, Japanese Laid-Open Patent Application No. 06-199183 fails to problems such as those described below that can arise when a material is drawn to form the floor panel of a vehicle body and the downward-opening battery housing space is formed in the floor panel.

For example, the elongation limit of the panel material limits the depth of the battery housing space. Therefore, when the panel material is drawn past this draw depth, the panel material typically breaks at the intersection between the side walls of the battery housing space.

A certain degree of deep drawing can be achieved by increasing the radius of rounding at the intersection between the side walls of the battery housing space, and by providing a draft angle tilt to the side walls of the battery housing space. However, in order to enable deep drawing of a battery housing space for housing a large-sized battery pack, the radius of rounding at the intersection between the side walls and the tilt angle of the side walls is increased to a large degree. Thus, the volume of the battery housing space is significantly reduced, which limits the size of the battery pack and sacrifices battery capacity.

Therefore, an object of the present invention is to provide a battery pack housing structure for a vehicle, such as an electric or hybrid vehicle, that can avoid the above problems.

In view of the state of the known technology, a vehicle battery pack housing structure basically includes a vehicle body panel, a first panel component, a second panel component and a third panel component. The first panel component is rigidly attached to the vehicle body panel, and the first panel component includes a first side wall and a base wall. The second panel component is rigidly attached to the first panel component, and the second panel component includes a second side wall and a first periphery wall portion. The third panel component is rigidly attached to the second panel component such that the first, second and third panel components define an outward-opening battery housing space. The third panel component includes a second periphery wall portion that cooperates with the first periphery wall portion to form a periphery wall portion when the third panel component is rigidly attached to the second panel component.

BRIEF DESCRIPTION OF THE DRAWINGS

Referring now to the attached drawings which form a part of this original disclosure.

Figure 7:
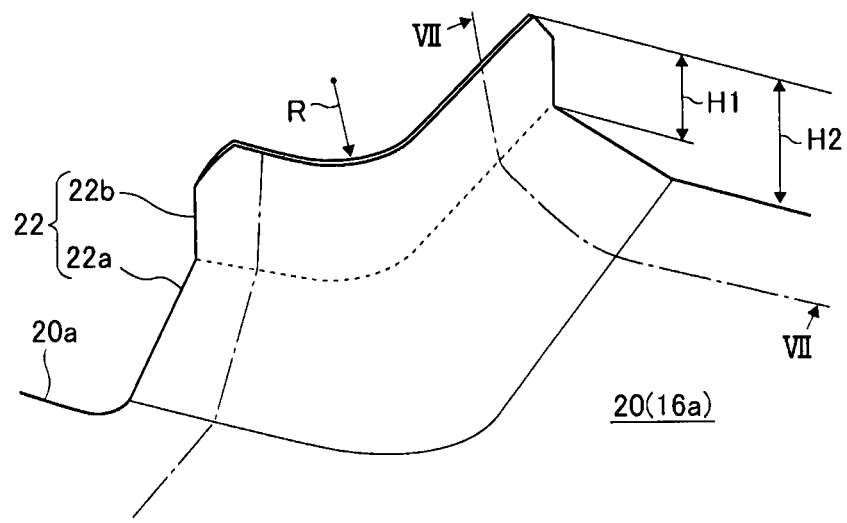
FIG. 7 is an enlarged perspective view of the flange forming the structural portion for sealing the corner gap shown in FIG. 6.
Figure 8:
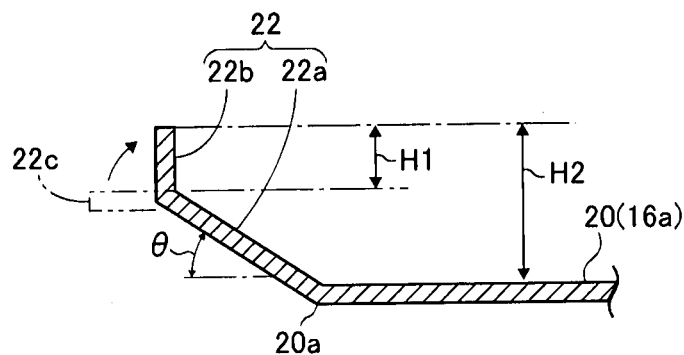
FIG. 8 is a cross sectional view of the flange forming the structural portion for sealing the corner gap shown in FIG. 6 as viewed along section line VII-VII of FIG. 7, showing the flange from the direction of the arrow.
Figure 9:
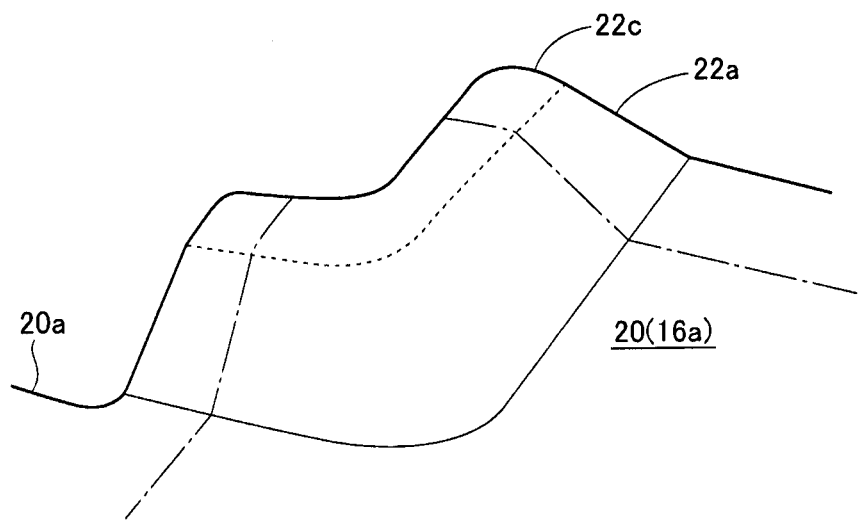
Figure 10:
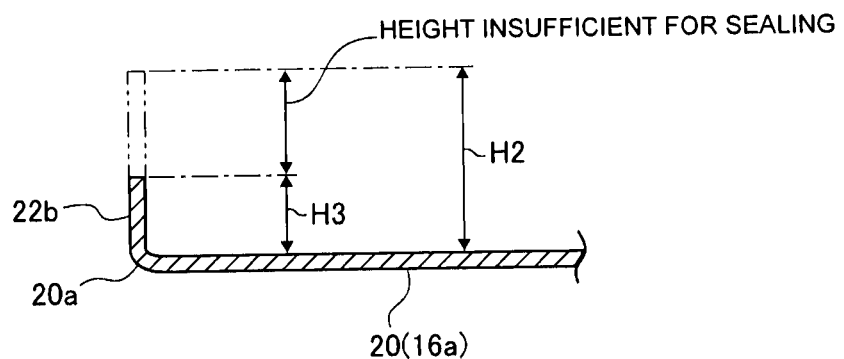

FIG. 9 is a perspective view the same as FIG. 7, showing the shape of the flange in FIG. 7 after primary molding thereof; and FIG. 10 is a sectional view the same as FIG. 8, showing the shape of the flange in FIG. 7 in a case in which there is no inclined flange part, and the flange is composed only of the upright flange part.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
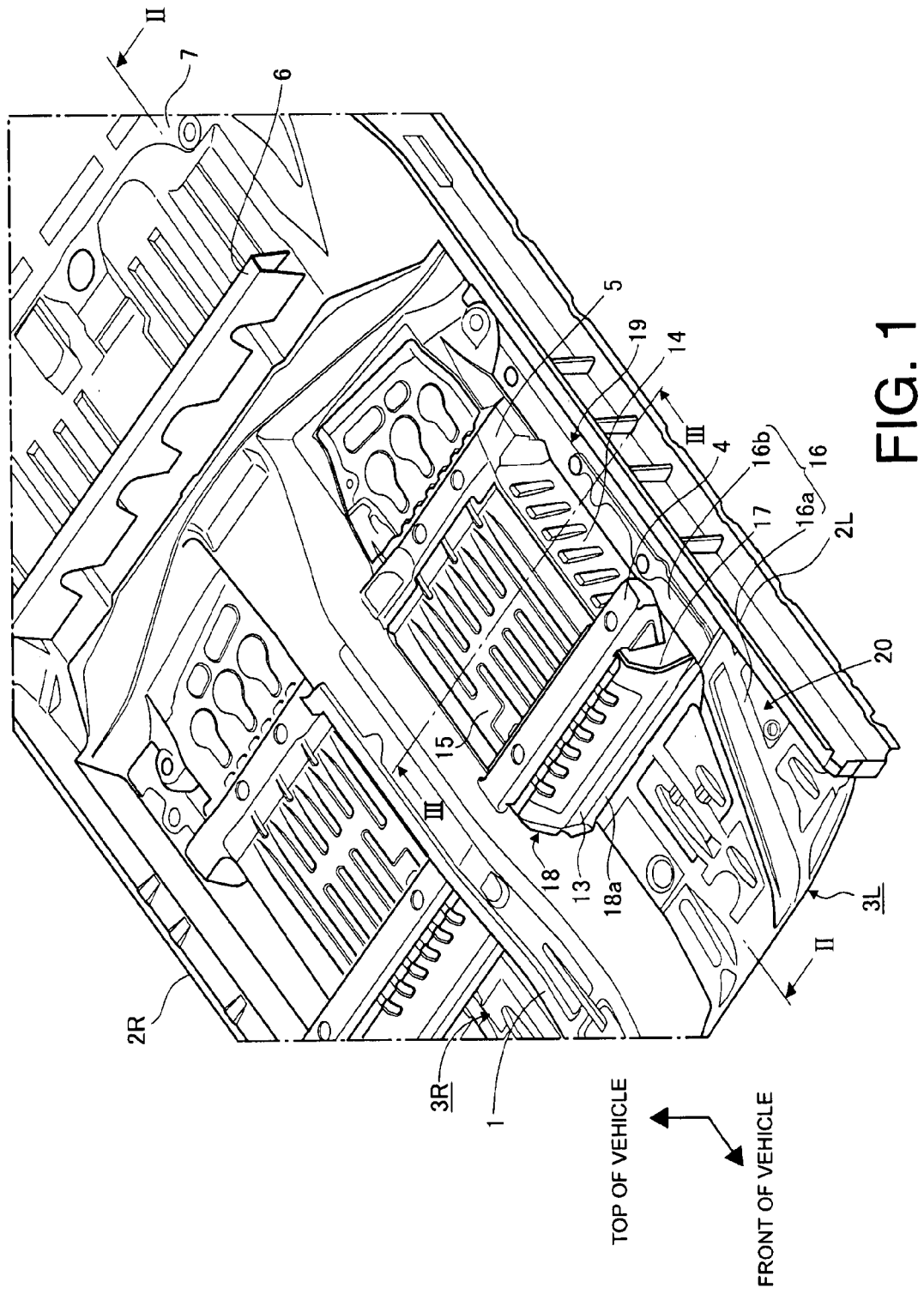
FIG. 1 is a perspective view from above the left side of the vehicle, showing the vehicle body floor portion of an electric vehicle that is provided with the battery pack housing structure as a disclosed embodiment.

Referring initially to FIG. 1, a vehicle battery pack housing structure is illustrated in accordance with a first embodiment. FIG. 1 is a perspective view from above the left side of the vehicle, and shows the vehicle body floor portion the vehicle that is provided with the battery pack housing structure according to an embodiment. The vehicle can be an electric vehicle, a hybrid vehicle or any type of vehicle having components, such as an electric motor, that are powered by a battery. Furthermore, the vehicle can be a car, truck, van, SUV or any other suitable vehicle.

Figure 2:
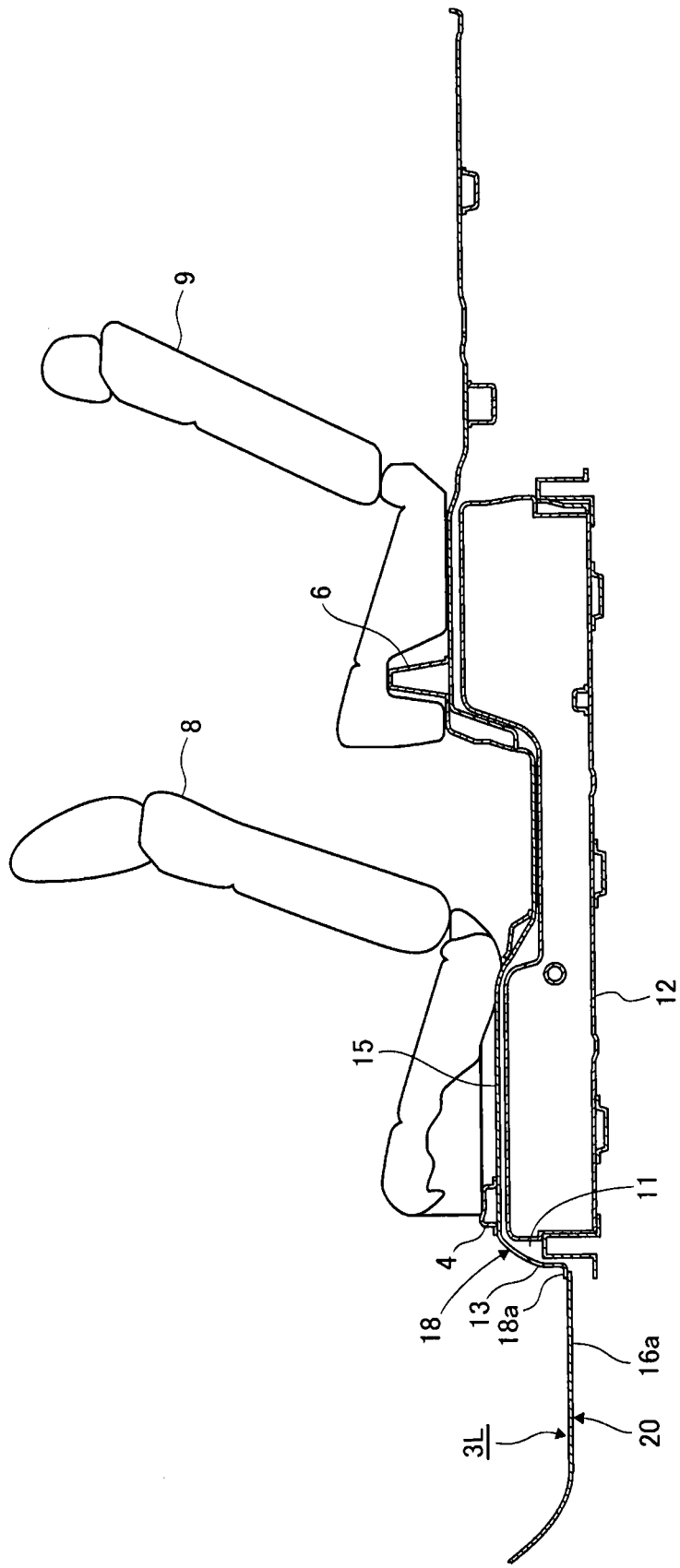
FIG. 2 is a longitudinal cross sectional side view showing a cross-section as viewed along section line II-II in FIG. 1, in which the vehicle body floor portion is shown together with the front and rear seats and the battery pack from the direction of the arrow.

The vehicle body floor portion includes a vehicle body floor portion including a floor tunnel 1, a left sill 2L, a right sill 2R, a left floor panel 3L and a right floor panel 3R. The floor tunnel 1, the left sill 2L, the right sill 2R and other related floor components individually or collectively can be referred to as a vehicle body panel. The vehicle body floor portion further includes a plurality of cross members 4, 5, 6 and 7 provided on the left and right floor panels 3L and 3R. The cross members 4, 5, 6 and 7 extend in the vehicle width direction along the left and right floor panels 3L and 3R. A front seat 8 is attached over the cross members 4 and 5 as shown in FIG. 2. A rear seat 9 is attached over the cross members 6, 7, also as shown in FIG. 2. The cross members 4, 5, 6 and 7 can be attached to the left and right floor panels 3L and 3R in any suitable manner, such as by welds, bolts, screws, rivets and so on. Furthermore, the front seat 8 and rear seat 9 can be coupled to the left and right floor panels 3L and 3R and the cross members 4, 5, 6 and 7 in any suitable manner, such as by welds, bolts, screws, rivets and so on.

Figure 3:
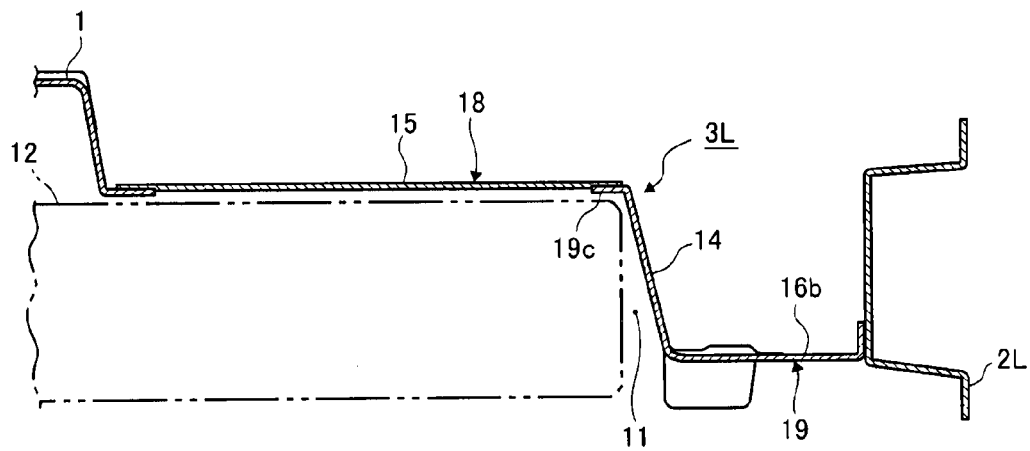
FIG. 3 is a longitudinal cross sectional front view showing a cross-section as viewed along section line III-III of the vehicle body floor portion in FIG. 1 from the direction of the arrow.

In this example, portions of the left and right floor panels 3L and 3R below the front seat 8 and the rear seat 9 are recessed upward in the vertical direction of the vehicle body (inward in the inside-outside direction of the vehicle body) to provide a downward-opening or outward-opening battery housing space 11, as shown in FIGS. 2 and 3. Naturally, however, the left and right floor panels 3L and 3R can be configured to provide an opening in any suitable direction. A battery pack 12 including a plurality of battery units (not shown) as discussed above is housed in the battery housing space 11.

The front seat 8 and the rear seat 9 are attached at a relatively high position within the vehicle, as shown in FIG. 2, for the desired seating level. As a result, unused dead space is present below the front seat 8 and the rear seat 9. Therefore, in the present example, the corresponding portions of the left and right floor panels 3L and 3R are raised to a level directly below the front seat 8 and the rear seat 9 so that the battery housing space 11 directly below the attachment points of the front seat 8 and the rear seat 9 is deeper than the rest of the battery housing space 11, as shown in FIGS. 2 and 3. The vertical thicknesses of the portions of the battery pack 12 that are directly below the front seat 8 and the rear seat 9 can thus be increased as shown in FIG. 2. These increases in thicknesses can correspond to the amounts that the portions of the left and right floor panels 3L and 3R directly below the seats 8 and 9 are raised in the manner described above. Thus, the thicknesses of the portions of the battery pack 12 can be the same or substantially the same as the distances that the portions of the left and right floor panels 3L and 3R directly below the seats are raised. Accordingly, the dead space directly below the front seat 8 and the rear seat 9 can effectively accommodate increased capacity of the battery pack 12 without sacrificing vehicle interior space.

However, when the downward-opening battery housing space 11 is provided in the left and right floor panels 3L and 3R during a process of drawing a material to form the left and right floor panels 3L and 3R, the elongation limit of the panel material can be exceeded. Accordingly, as discussed above, the panel material can break. Typically, the panel material would break at the intersection between the side walls of the battery housing space.

As also discussed above, the radius of rounding at the intersection between the side walls of the battery housing space can be increased to reduce the occurrence breaking. Also, a draft angle tilt can be provided to the side walls of the battery housing space to reduce the occurrence of breaking. However, in order to enable deep drawing of the material to form a housing space that is sufficient to house a deep, large-sized battery pack, the radius of rounding at the intersection between the side walls and the tilt angle of the side walls is significantly increased. The larger radius of rounding and larger tilt angle can reduce the internal volume of the battery housing space, which limits the size and capacity of the battery pack.

Accordingly, the following describes an example for providing the left and right floor panels 3L and 3R which can avoid the above problems. It should also be noted that the configurations for providing the battery housing space 11 in relation to the left-side floor panel 3L and the right-side floor panel 3R are the same or similar to each other. Therefore, for purposes of example, the configuration for providing the battery housing space 11 in relation to the left-side floor panel 3L will be described. The right-side floor panel 3R can be configured in the same or similar manner but as a mirror image of the left-side floor panel 3L.

The walls that define the downward-opening battery housing space 11 will first be described. As shown, for example, in FIGS. 1-4, the battery housing space 11 is defined by side walls 13 and 14, a base wall 15, and an open periphery wall 16. The side walls 13 and 14 extend along the downward opening. The base wall 15 is positioned to for blocking the opening at the far side from the downward opening. Also, the base wall 15 is partitioned by the side walls 13 and 14. The opening periphery wall 16 extends in the peripheral direction of the downward opening from the side walls 13 and 14. The opening periphery wall 16 is separated into open periphery wall portion 16a and 16b.

Figure 4:
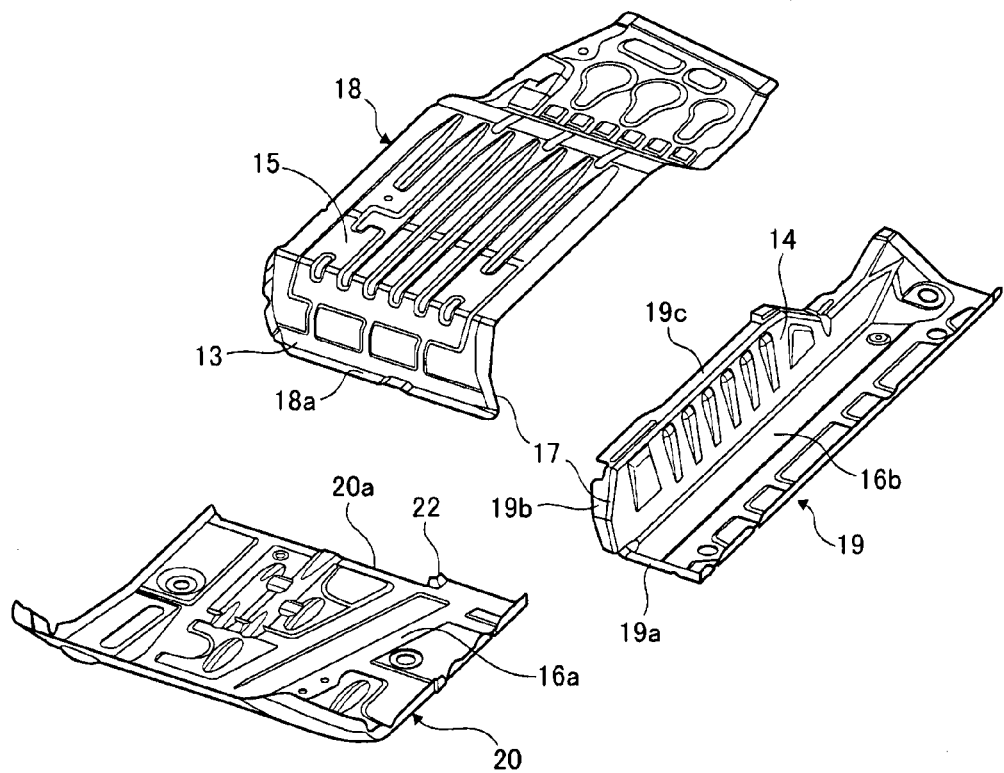
FIG. 4 is an exploded perspective view showing the battery pack housing structure according to the embodiment shown in FIGS. 1 to 3.

As shown in FIG. 1 and in more detail in FIG. 4, the side walls 13 and 14 are separated at a side wall intersection line 17 at which the side walls 13 and 14 intersect each other. In this example, the side wall 13 is integrally formed with the base wall 15 as part of a first panel component 18. Furthermore, the side wall 14 in this example is integrally formed with the opening periphery wall portion 16b (first periphery wall portion) as part of a second panel component 19. The opening periphery wall portion 16a (second periphery wall portion) in this example is formed as part of a third panel component 20.

The battery housing space-defining walls 13 to 16 are separated as described above. Hence, the downward-opening battery housing space 11 is defined by the first panel component 18 that includes the side wall 13 and base wall 15, the second panel component 19 that includes the side wall 14 and opening periphery wall portion 16b, and a third panel component 20 that includes the opening periphery wall portion 16a as shown in FIG. 4. In this example, the downward-opening battery housing space 11 is provided on the left-side floor panel 3L by assembling and joining together the three panel components 18 to 20.

That is, in this example, a flange 18a is present at the end of the side wall 13 which is part of the first panel component 18. The flange 18a overlaps the third panel component 20, and thus can overlap a portion of the opening periphery wall portion 16a. The flange 18a thus enables a sealing joint to be formed along the location at which the panel components 18 and 20 are assembled and joined together.

In addition, a flange 19a is present at the opening periphery wall portion 16b of the second panel component 19. The flange 19a overlaps the third panel component 20, and thus overlaps a portion of the opening periphery wall portion 16a. A flange 19b is present at an edge of the side wall 14. The flange 19b thus overlaps the side wall 13 at the intersection line 17 of the side walls 13 and 14. A flange 19c is present along at least a portion of the side wall 14. Accordingly, the flange 19c overlaps the base wall 15.

Figure 5:
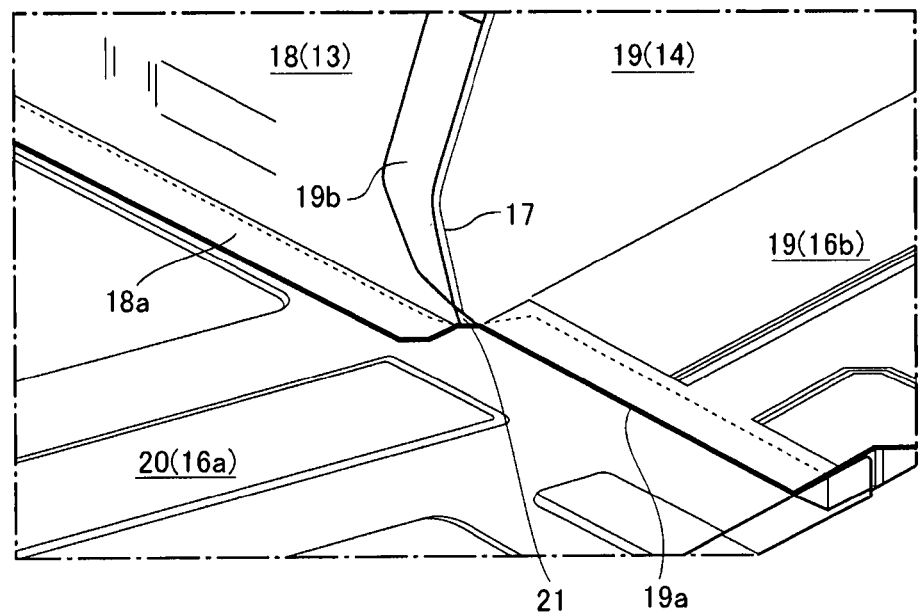
FIG. 5 is a perspective view showing the corner gap formed at the conjunction point of the three panel components that form the battery pack housing structure according to the embodiment shown in FIGS. 1 to 4.

As indicated, the flanges 18a, 19a, 19b and 19c provide seals between the adjacent components that are assembled and joined together as discussed above. However, as shown in FIG. 5, a corner gap 21 may be present at a location or conjunction point where a corner of the first panel component 18, a corner of the second panel component 19 and the third panel component 20 are proximate to each other.

The corner gap 21 can be sealed by, for example, a heat-expanding resin. The heat-expanding resin can be packed into the corner gap 21 and expanded by heat during, for example, a coating step. Thus, this sealing can be achieved by a separate step of packing the heat-expanding resin into the corner gap 21 and heating the heat-expanding resin. Furthermore, the heat-expanding resin may be expensive, which can increase the overall cost of the battery pack housing structure.

Figure 6:
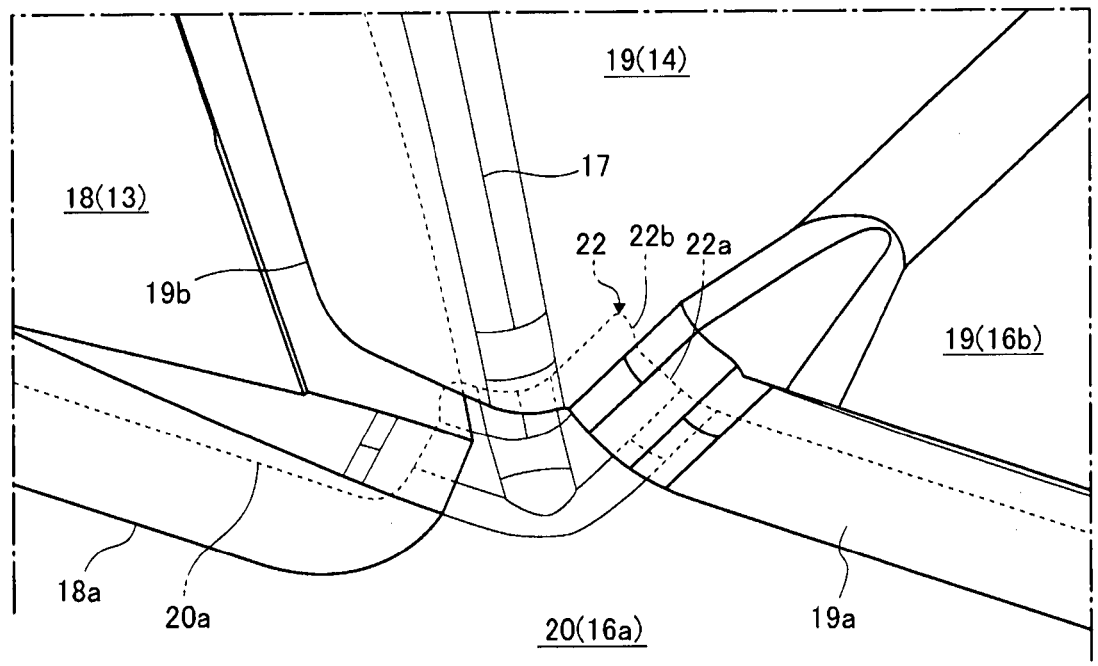
FIG. 6 is a perspective view the same as FIG. 5, showing the structural portion for sealing the corner gap shown in FIG. 5 in the battery pack housing structure according to the embodiment shown in FIGS. 1 to 4.

Therefore, in this example, a flange 22 that can be formed by folding can be used to sealing the corner gap 21. That is, as shown in FIGS. 4 and 6, the flange 22 can be formed to extend upright from an internal peripheral region 20a of the third panel component 20, such as from the opening periphery wall portion 16a, to overlap the side wall intersection line 17 at which the side walls 13 and 14 intersect each other. As shown in more detail in FIGS. 6, 7 and 8, the flange 22 includes an inclined flange part 22a which extends at a predetermined slope θ from the internal peripheral region 20a of the panel component 20 (e.g., from the opening periphery wall portion 16a) toward the intersection line 17 of the side walls 13 and 14 at which an edge of the first side wall 13 and an edge of the second side wall 14 are positioned proximate to each other. The flange 22 further includes an upright flange part 22b which extends along the intersection line 17 of the side walls 13 and 14 from the distal end of the inclined flange part 22a to a free end of the upright flange part 22b.

In the process for forming the flange 22, a projection for shaping the flange 22 is provided to extend inward from the internal peripheral region 20a of the panel component 20, such as the opening periphery wall portion 16a. This projection for shaping the flange 22 can be molded by pressing or the like to form a structure that includes the inclined flange part 22a having the inclination angle θ, and a horizontal flange part 22c which extends in the horizontal direction from the distal end of the inclined flange part 22a, as shown in FIG. 9. The horizontal direction can be parallel or substantially parallel to the panel component 20.

The horizontal flange part 22c described above is then raised in the direction of the arrow from the position of the double-dashed line in FIG. 8 that corresponds to the state shown in FIG. 9, to the position of the solid line. That is, a tool or other device can be used to apply a force against the horizontal flange part 22c to raise the horizontal flange part in the direction of the arrow shown in FIG. 8. Accordingly, the upright flange part 22b is formed upright from the distal end of the inclined flange part 22a, as shown in FIG. 7. When the three panel components 18 through 20 are assembled and joined together to provide the downward-opening battery housing space 11 to the left-side floor panel 3L as described above, the upright flange part 22b extends along the intersection line 17 of the side walls 13 and 14, and is joined to the intersection line 17. The upright flange part 22b can cover the conjunction point that is defined by the edges of the first and second side walls 13 and 14 and the internal peripheral region 20a of the third panel component 20. Thus, the upright flange part 22b can seal the corner gap 21 shown in FIG. 5 at the conjunction point of the three panel components 18 through 20 by cooperation with the inclined flange part 22a.

Again, as shown in FIG. 7, the upright flange part 22b is upright from the distal end of the inclined flange part 22a that extends at a predetermined slope θ on the third panel component 20 instead of being upright from the third panel component 20 as shown in FIG. 10. Accordingly, the height to which the flange is raised during molding of the upright flange part 22b can be small, as indicated by height H1 in FIG. 7, regardless of the required height H2 of the flange 22 that is used for sealing the corner gap 21 shown in FIG. 5.

The amount of tension at the distal end during flange-raising of the upright flange part 22b can therefore be reduced without regard to the required height H2 of the flange 22. Also, it is possible to prevent the distal end of the upright flange part 22b from breaking during flange-raising which could compromise the sealing function of the flange 22. Accordingly, the height of the upright flange part 22b is configured such that the distal end is not broken by exceeding the tensile limit of the panel material during flange-raising, and the inclination angle θ of the inclined flange part 22a is set in order to satisfy this configuration.

In addition, when an inclined flange part 22a, such as the one provided in FIG. 7, is not set and the upright flange part 22b is formed from the plane of the panel component 20, the height of the upright flange part 22b is configured to be at least the same as the required flange height H2 that indicated by the double-dashed line as shown in FIG. 10. However, when the upright flange part 22b is high, the amount of tension at the distal end of the upright flange part 22b during the raising of the flange increases. Thus, the distal end of the upright flange part 22b may break during the raising process, which can adversely affect the sealing function.

On the other hand, when measures are taken to prevent such breakage of the upright flange part 22b by, for example, setting the radius of rounding at the side wall intersection line 17 to be small, the curvature radius of the upright flange part 22b as indicated by R in FIG. 7 can be small. In this configuration, the maximum height of the upright flange part 22b is as low as H3 (≈H1) as shown in FIG. 10. Thus, the height of the upright flange part 22b would generally be insufficient in relation to the flange height H2 so seal the corner gap 21 as shown in FIG. 5.

As can be appreciated from the above, the battery pack housing structure includes separate battery housing space-defining walls 13 to 16 that define the downward-opening battery housing space 11. The first panel component 18 includes the side wall 13 and base wall 15. The second panel component 19 includes the side wall 14 and the opening periphery wall portion 16b as shown in FIG. 4. The third panel component 20 that includes the opening periphery wall portion 16a. Thus, the downward-opening battery housing space 11 is defined by the first panel component 18, the second panel component 19 and the third panel component 20 that are assembled and joined together by any suitable type of fastening member as discussed herein.

The downward-opening battery housing space 11 can therefore be provided to the floor panel 3L without relying on drawing a material. Accordingly, a deep and large battery housing space 11 can be provided at the floor panel 3L without increasing the radius of rounding at the side wall intersection line 17 of the downward-opening battery housing space 11, and without placing the side walls 13 and 14 of the downward-opening battery housing space 11 at an inclined angle. Consequently, the radius of rounding at the side wall intersection line 17 of the battery housing space 11 can be made as small as possible. Moreover, the side walls 13 and 14 of the battery housing space 11 need not be inclined, and the side walls 13 and 14 may even be orthogonal or substantially orthogonal to the base wall 15. Therefore, the internal volume of the battery housing space 11 need not be reduced to limit the size and capacity of the battery pack 12.

In addition, since the battery housing space 11 is configured as a downward-opening battery housing space in which the floor panel 3L is recessed upward in the vertical direction of the vehicle body, unused dead space directly below the seats 8 and 9 is effectively utilized. Hence, the battery housing space 11 can be enlarged without sacrificing vehicle interior space, and the capacity of the battery pack 12 can be increased.

Also, the flange 22 can seal the corner gap 21 that may be present at the location where the three panel components 18 through 20 meet without the use of a resin, for example, that can increase the complexity and cost of assembling the three panel components 18 through 20 as discussed above. This sealing by the flange 22 can prevent or at least inhibit the penetration of water or the like into the battery housing space 11 through the corner gap 21.

Furthermore, the battery housing space-defining walls 13 though 16 need not be separate and then assembled as discussed above. For example, the side walls 13 and 14 can be integrally formed as a frame. The base wall 15 can be formed separately from the side walls 13 and 14. Also, the opening periphery wall 16 can be a single integral component instead of being formed as separate opening periphery wall portions 16a and 16b. In addition, the opening periphery wall 16 can be formed separately from the side walls 13 and 14. Alternatively, the walls 13 through 16 can be formed separate from each other or integral with each other as desired. Hence, the benefits discussed above can still be achieved by a battery pack housing structure in which the battery housing space-defining walls 13 to 16 are separated or integral in this manner.

In understanding the scope of the present invention, as used herein to describe the above embodiment(s), the following directional terms "forward", "rearward", "above", "downward", "vertical", "horizontal", "below" and "transverse" as well as any other similar directional terms refer to those directions of a vehicle equipped with the electric vehicle battery pack housing structure. Accordingly, these terms, as utilized to describe the present invention should be interpreted relative to a vehicle equipped with the electric vehicle battery pack housing structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle battery pack housing structure comprising:
a vehicle body panel;
a first panel component rigidly attached to the vehicle body panel, the first panel component including a first side wall and a base wall;
a second panel component rigidly attached to the first panel component, the second panel component including a second side wall and a first periphery wall portion; and
a third panel component rigidly attached to the second panel component such that the first, second and third panel components define an outward-opening battery housing space, the third panel component including a second periphery wall portion that cooperates with the first periphery wall portion to form a periphery wall portion when the third panel component is rigidly attached to the second panel component
the first, second and third panel components being independently formed as separate pieces, with the first, second and third panel components being joined together,
the first periphery wall portion extending in a peripheral direction of the outward-opening battery housing space with respect to the second side wall, the second periphery wall portion extending in the peripheral direction of the outward-opening battery housing space with respect to the first side wall;
wherein the third panel component further comprises a flange extending from a peripheral region of the third panel component, the flange including an inclined flange part which extends at a predetermined angle from the peripheral region toward an intersection line at which an edge of the first side wall and an edge of the second side wall are positioned proximate to each other and an upright flange part which extends along the intersection line from a distal end of the inclined flange part, and the flange being configured to cover a conjunction point that is defined by the edges of the first and second side walls and the peripheral region of the third panel component;

wherein the inclination angle of the inclined flange part is set at an angle with respect to a tensile limit of material forming the flange that enables the upright flange part to have a height which permits folding of the flange at a location at which the inclined flange part and upright flange part are connected without exceeding the tensile limit of the material to avoid breaking of the upright flange part.

2. The vehicle battery pack housing structure according to claim 1, wherein the vehicle body panel is included in a vehicle body floor panel; and the outward-opening battery housing space extends in a vertical upward direction with respect to the vehicle body panel and is open in a downward vertical direction with respect to the vehicle body panel.

3. The vehicle battery pack housing structure according to claim 2, wherein the first and second periphery wall portions are included in a vehicle body floor panel.

4. The vehicle battery pack housing structure according to claim 1, wherein the vehicle body panel is included in a vehicle body floor panel; and the outward-opening battery housing space extends in a vertical upward direction with respect to the vehicle body panel and is open in a downward vertical direction with respect to the vehicle body panel.

5. The vehicle battery pack housing structure according to claim 1, wherein the vehicle body panel is included in a vehicle body floor panel; and the outward-opening battery housing space extends in a vertical upward direction with respect to the vehicle body panel and is open in a downward vertical direction with respect to the vehicle body panel.

6. The vehicle battery pack housing structure according to claim 1, wherein the first and second periphery wall portions are included in a vehicle body floor panel.

7. The vehicle battery pack housing structure according to claim 1, wherein the first and second periphery wall portions are included in a vehicle body floor panel.

8. The vehicle battery pack housing structure according to claim 1, wherein the first and second periphery wall portions are included in a vehicle body floor panel.

9. A vehicle battery pack housing structure assembly method comprising:

providing a vehicle body panel;

rigidly attaching a first panel component to the vehicle body panel, the first panel component including a first side wall and a base wall;

rigidly attaching a second panel component to the first panel component, the second panel component including a second side wall and a first periphery wall portion; and rigidly attaching a third panel component to the second panel component such that the first, second and third panel components define an outward-opening battery housing space, the third panel component including a second periphery wall portion that cooperates with the first periphery wall portion to form a periphery wall portion when the third panel component is rigidly attached to the second panel component, the first periphery wall portion extending in a peripheral direction of the outward-opening battery housing space with respect to the second side wall, the second periphery wall portion extending in the peripheral direction of the outward-opening battery housing space with respect to the first side wall;

wherein the third panel component further comprises a flange extending from a peripheral region of the third panel component, the flange including an inclined flange part which extends at a predetermined angle from the peripheral region toward an intersection line at which an edge of the first side wall and an edge of the second side wall are positioned proximate to each other and an upright flange part which extends along the intersection line from a distal end of the inclined flange part, and the flange being configured to cover a conjunction point that is defined by the edges of the first and second side walls and the peripheral region of the third panel component;

wherein the inclination angle of the inclined flange part is set at an angle with respect to a tensile limit of material forming the flange that enables the upright flange part to have a height which permits folding of the flange at a location at which the inclined flange part and upright flange part are connected without exceeding the tensile limit of the material to avoid breaking of the upright flange part.

10. The vehicle battery pack housing structure assembly method according to claim 9, wherein the vehicle body panel is included in a vehicle body floor panel; and the outward-opening battery housing space extends in a vertical upward direction with respect to the vehicle body panel and is open in a downward vertical direction with respect to the vehicle body panel.

11. The vehicle battery pack housing structure assembly method according to claim 10, wherein the first and second periphery wall portions are included in a vehicle body floor panel.

12. The vehicle battery pack housing structure assembly method according to claim 9, wherein the vehicle body panel is included in a vehicle body floor panel; and the outward-opening battery housing space extends in a vertical upward direction with respect to the vehicle body panel and is open in a downward vertical direction with respect to the vehicle body panel.

13. The vehicle battery pack housing structure assembly method according to claim 9, wherein the vehicle body panel is included in a vehicle body floor panel; and the outward-opening battery housing space extends in a vertical upward direction with respect to the vehicle body panel and is open in a downward vertical direction with respect to the vehicle body panel.

14. The vehicle battery pack housing structure assembly method according to claim 9, wherein the first and second periphery wall portions are included in a vehicle body floor panel.

15. The vehicle battery pack housing structure assembly method according to claim 9, wherein the first and second periphery wall portions are included in a vehicle body floor panel.

16. The vehicle battery pack housing structure assembly method according to claim 9, wherein the first and second periphery wall portions are included in a vehicle body floor panel.

* * * * *